(12) United States Patent
Yang et al.

(10) Patent No.: US 7,670,880 B2
(45) Date of Patent: Mar. 2, 2010

(54) METHOD AND STRUCTURE FOR FORMING AN INTEGRATED SPATIAL LIGHT MODULATOR

(75) Inventors: Xiao Yang, Cupertino, CA (US); Dongmin Chen, Saratoga, CA (US); Kegang Huang, Fremont, CA (US)

(73) Assignee: Miradia Inc., Santa Clara, CA (US)

( * ) Notice: Subject to any disclaimer, the term of this patent is extended or adjusted under 35 U.S.C. 154(b) by 291 days.

(21) Appl. No.: 11/670,362

(22) Filed: Feb. 1, 2007

(65) Prior Publication Data

US 2007/0128771 A1    Jun. 7, 2007

Related U.S. Application Data

(63) Continuation of application No. 11/028,946, filed on Jan. 3, 2005, now Pat. No. 7,172,921.

(51) Int. Cl.
    H01L 21/00    (2006.01)
(52) U.S. Cl. .................. 438/125; 438/57; 257/E21.499
(58) Field of Classification Search ................. 438/125, 438/57
    See application file for complete search history.

(56) References Cited

U.S. PATENT DOCUMENTS

| 4,229,732 A | 10/1980 | Hartstein et al. |
| 4,317,611 A | 3/1982 | Petersen |
| 4,566,935 A | 1/1986 | Hornbeck |
| 4,615,595 A | 10/1986 | Hornbeck |
| 5,061,049 A | 10/1991 | Hornbeck |
| 5,170,283 A | 12/1992 | O'Brien et al. |
| 5,172,262 A | 12/1992 | Hornbeck |

(Continued)

FOREIGN PATENT DOCUMENTS

EP    1237032 A2    9/2002

(Continued)

OTHER PUBLICATIONS

Henley et al., "A New SOI Manufacturing Technology Using Atomic layer Cleaving." Silicon Genesis Corporation Campbell CA. pp. 1-5, 1999.

(Continued)

*Primary Examiner*—Phat X Cao
*Assistant Examiner*—Nga Doan
(74) *Attorney, Agent, or Firm*—Townsend and Townsend and Crew LLP

(57) ABSTRACT

A method of fabricating an integrated spatial light modulator. The method includes providing a first substrate including a bonding surface and processing a device substrate to form at least an electrode layer. The method also includes depositing a first portion of a multi-layer standoff layer on the electrode layer, depositing a second portion of the multi-layer standoff layer on the first portion of the multi-layer standoff layer, and forming electrically insulating standoff structures from the multi-layer standoff layer. The method further includes joining the bonding surface of the first substrate to the standoff structures on the device substrate, thinning the first substrate, patterning the first substrate to form a mask, and forming a plurality of moveable structures from the first substrate. The moveable structures are aligned with at least one of the plurality of electrodes and adapted to rotate with respect to the standoff structures.

24 Claims, 7 Drawing Sheets

U.S. PATENT DOCUMENTS

| | | | |
|---|---|---|---|
| 5,311,360 A | 5/1994 | Bloom et al. | |
| 5,382,961 A | 1/1995 | Gale, Jr. | |
| 5,448,314 A | 9/1995 | Heimbuch et al. | |
| 5,452,024 A | 9/1995 | Sampsell | |
| 5,489,952 A | 2/1996 | Gove et al. | |
| 5,504,614 A | 4/1996 | Webb et al. | |
| 5,535,047 A | 7/1996 | Hornbeck | |
| 5,583,688 A | 12/1996 | Hornbeck | |
| 5,589,852 A | 12/1996 | Thompson et al. | |
| 5,600,383 A | 2/1997 | Hornbeck | |
| 5,661,591 A | 8/1997 | Lin et al. | |
| 5,663,749 A | 9/1997 | Farris et al. | |
| 5,742,419 A | 4/1998 | Dickensheets et al. | |
| 5,757,536 A * | 5/1998 | Ricco et al. | 359/224.1 |
| 5,835,256 A | 11/1998 | Huibers | |
| 5,999,306 A | 12/1999 | Atobe et al. | |
| 6,038,056 A | 3/2000 | Florence et al. | |
| 6,046,840 A | 4/2000 | Huibers | |
| 6,049,317 A | 4/2000 | Thompson et al. | |
| 6,172,797 B1 | 1/2001 | Huibers | |
| 6,201,521 B1 | 3/2001 | Doherty | |
| 6,252,277 B1 | 6/2001 | Chan et al. | |
| 6,323,982 B1 | 11/2001 | Hornbeck | |
| 6,337,760 B1 | 1/2002 | Huibers et al. | |
| 6,356,378 B1 | 3/2002 | Huibers | |
| 6,388,661 B1 | 5/2002 | Richards | |
| 6,396,619 B1 | 5/2002 | Huibers et al. | |
| 6,429,033 B1 | 8/2002 | Gee et al. | |
| 6,489,241 B1 * | 12/2002 | Thilderkvist et al. | 438/689 |
| 6,529,310 B1 | 3/2003 | Huibers et al. | |
| 6,538,800 B2 | 3/2003 | Huibers | |
| 6,542,653 B2 | 4/2003 | Wu et al. | |
| 6,543,286 B2 | 4/2003 | Garverick et al. | |
| 6,642,913 B1 | 11/2003 | Kimura et al. | |
| 6,809,852 B2 | 10/2004 | Tao et al. | |
| 2002/0024483 A1 * | 2/2002 | Makino | 345/87 |
| 2002/0041455 A1 | 4/2002 | Sawada et al. | |
| 2002/0071166 A1 | 6/2002 | Jin et al. | |
| 2002/0071169 A1 | 6/2002 | Bowers et al. | |
| 2002/0132389 A1 | 9/2002 | Patel et al. | |
| 2003/0030118 A1 * | 2/2003 | Kim | 257/414 |
| 2003/0117686 A1 | 6/2003 | DiCarlo | |
| 2004/0004753 A1 | 1/2004 | Pan | |
| 2004/0008402 A1 | 1/2004 | Patel et al. | |
| 2004/0125347 A1 | 7/2004 | Patel et al. | |
| 2004/0136044 A1 | 7/2004 | Miller et al. | |
| 2004/0184133 A1 | 9/2004 | Su et al. | |
| 2004/0190817 A1 | 9/2004 | Aubuchon | |
| 2004/0214350 A1 | 10/2004 | Pan et al. | |
| 2005/0041277 A1 | 2/2005 | Huibers | |
| 2005/0052725 A1 | 3/2005 | Niklaus et al. | |
| 2005/0157370 A1 | 7/2005 | Chen | |

FOREIGN PATENT DOCUMENTS

| | | |
|---|---|---|
| WO | WO 03/068669 | 8/2003 |

OTHER PUBLICATIONS

Petersen, K.E., Micromechanical Light Modulator Array Fabricated On Silicon. Applied Physics Letters. Oct. 15, 1977, pp. 521-523, vol. 31 No. 8.

Petersen, K.E., Micromechanical Membrane Switches On Silicon, IBM J. Res. Develop., Jul. 1979, pp. 376-385. vol. 23, No. 4.

* cited by examiner

METHOD AND STRUCTURE FOR FORMING AN INTEGRATED SPATIAL LIGHT MODULATOR

CROSS-REFERENCES TO RELATED APPLICATIONS

This application is a continuation of U.S. patent application Ser. No. 11/028,946, filed Jan. 3, 2005, which is hereby incorporated by reference for all purposes.

BACKGROUND OF THE INVENTION

The present invention relates generally to semiconductor processing techniques. More particularly, the invention includes a method and structure for forming an integrated spatial light modulator. Merely by way of example, the invention has been applied to a method of forming standoff structures present in a bonded substrate structure. The method and structure can be applied to other applications as well, such as actuators, sensors, detectors, and display components.

Spatial light modulators (SLMs) have numerous applications in the areas of optical information processing, projection displays, video and graphics monitors, and televisions. Reflective SLMs are devices that modulate incident light in a spatial pattern to reflect an image corresponding to an electrical or optical input. The incident light may be modulated in phase, intensity, polarization, or deflection direction. A reflective SLM is typically comprised of a one or two-dimensional array of addressable picture elements (pixels) capable of reflecting incident light. Source pixel data is first processes by an associated control circuit, then loaded into the pixel array, one frame at a time.

The fabrication processes used to manufacture SLMs are varied. In some of the fabrication processes, multiple substrates are bonded together to form the SLM structure. Some of these fabrication processes require alignment of the substrates with tolerances on the order of microns prior to bonding, which may be a time consuming and expensive process.

Therefore there is a need in the art for improved methods and structures for integrated SLMs.

SUMMARY OF THE INVENTION

According to the present invention semiconductor processing techniques are provided. More particularly, the invention includes a method and structure for forming an integrated spatial light modulator. Merely by way of example, the invention has been applied to a method of forming standoff structures present in a bonded substrate structure. The method and structure can be applied to other applications as well, such as actuators, sensors, detectors, and display components.

In a specific embodiment of the present invention, a method of fabricating an integrated spatial light modulator is provided. The method comprises providing a first substrate including a bonding surface, processing a device substrate to form at least an electrode layer, the electrode layer including a plurality of electrodes, and depositing a standoff layer on the electrode layer. The method also comprises forming standoff structures from the standoff layer and joining the bonding surface of the first substrate to the standoff structures on the device substrate.

In another specific embodiment of the present invention, a method of fabricating an integrated spatial light modulator is provided. The method comprises providing a first substrate including a bonding surface, providing a second substrate including a plurality of electrodes, and depositing a standoff layer on the second substrate. The method also comprises forming standoff structures from the standoff layer, joining the bonding surface of the first substrate to the standoff structures on the second substrate, and thinning the first substrate. The method further comprises patterning the first substrate to form a mask; and forming a plurality of moveable structures from the first substrate, at least one of the moveable structures aligned with at least one of the plurality of electrodes.

In yet another specific embodiment of the present invention, an array of integrated spatial light modulators is provided. The array of integrated spatial light modulators comprises an electrode layer coupled to a device substrate, the electrode layer including a plurality of electrodes and at least one alignment mark, and a three-dimensional standoff structure, the standoff structure having side regions defined in a plane parallel to the device substrate, bottom regions coupled to the device substrate, and top regions opposite the bottom regions. The apparatus further comprises a semi-transparent silicon layer coupled to the top regions of the standoff structure, the semi-transparent silicon layer comprising a hinge support region coupled to the top regions of the standoff structure, a plurality of hinges coupled to the hinge support regions, and a plurality of moveable members aligned with respect to the at least one alignment mark by imaging the at least one alignment mark through the semi-transparent silicon layer.

Numerous benefits are achieved using the present invention over conventional techniques. For example, in an embodiment according to the present invention, the alignment tolerances used during the substrate bonding process are greatly relaxed. Moreover, the dimensions of the composite substrate used in one embodiment are reduced, decreasing cost and improving layer uniformity. This increased layer uniformity extends, for example, to the thickness of a micromirror layer present in the composite substrate. Additionally, standoffs fabricated according to embodiments of the present invention provide a bonding surface with decrease surface roughness, leading to an increase in bond strength. Depending upon the embodiment, one or more of these benefits may exist. These and other benefits have been described throughout the present specification and more particularly below.

Various additional objects, features and advantages of the present invention can be more fully appreciated with reference to the detailed description and accompanying drawings that follow.

DESCRIPTION OF SPECIFIC EMBODIMENTS

According to the present invention semiconductor processing techniques are provided. More particularly, the invention includes a method and structure for forming an integrated spatial light modulator. Merely by way of example, the invention has been applied to a method of forming standoff structures present in a bonded substrate structure. The method and structure can be applied to other applications as well, such as actuators, sensors, detectors, and display components.

Figure 1:
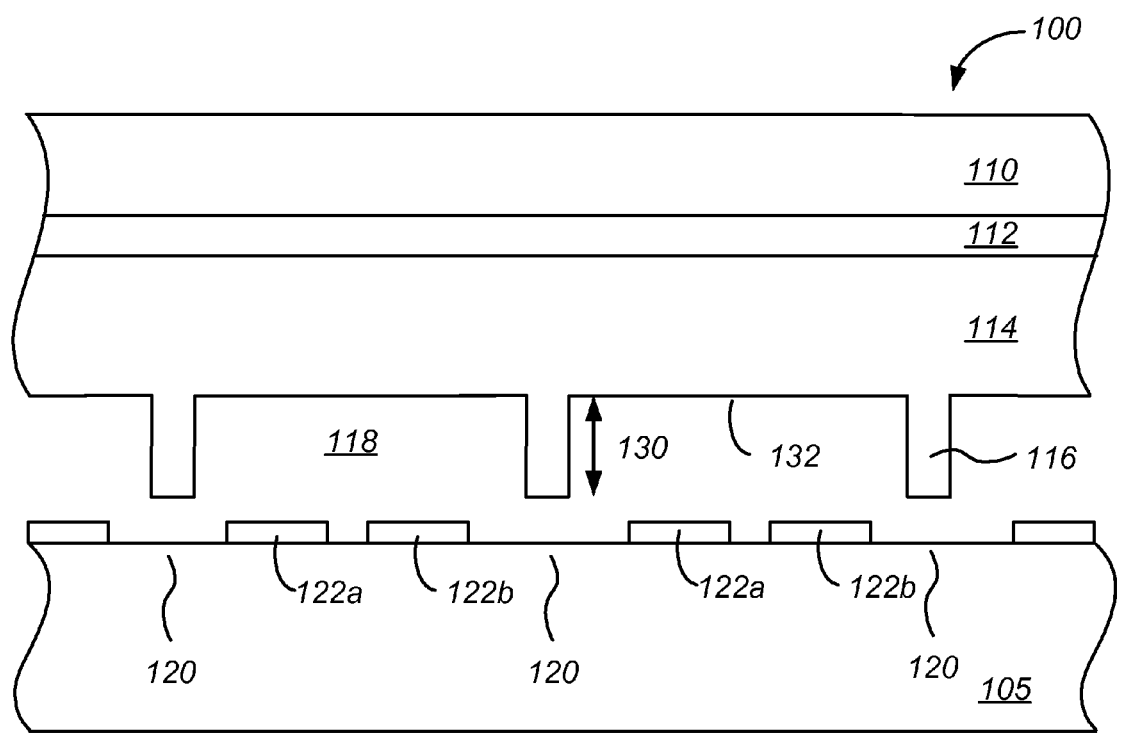
FIG. 1 is a simplified schematic side view illustration of a conventional SOI substrate and an electrode substrate prior to wafer bonding.

FIG. 1 is a simplified schematic side view illustration of a conventional silicon on insulator (SOI) substrate structure and an electrode substrate prior to wafer bonding. In some applications, SOI substrate 100 is processed to include a plurality of deflection devices (not shown) formed from layer 114. The deflection devices can be mirror structures, such as movable mirrors. Such mirror structures can be used for display devices, such as an array of micro-mirrors forming a spatial light modulator or the like. As illustrated in the figure, layer 110 is silicon, layer 112 is a buried oxide, and layer 114 is single crystal silicon. Other like substrate materials, for example, polysilicon or amorphous silicon are used to form layers 110 through 114 in other embodiments.

Layer 114 of the SOI substrate is processed using semiconductor processing techniques to form support members 116, which extend from the surface of the layer 114. Masking and etching processes well known to those of skill in the art are utilized to form support members 116. In a typical process, the depth 130 of the etch step defines the height of the support members while the lateral dimensions of the masking layer define the two-dimensional profile of the support members. The surface morphology at surface 132 is a function of the etch process and is typically selected to provide a smooth surface with a uniform etch depth. Although the support members 116 are illustrated in only one dimension in the figure, they typically form two-dimensional structures, defining recessed regions 118 surrounded by support members 116. Support members fabricated from a layer of single crystal silicon provide a degree of mechanical rigidity to the composite structure and are processed using well developed semiconductor processing techniques.

The electrode substrate 105 can be an integrated circuit device having a plurality of electrode devices 122, as shown. The integrated circuit device can include drive devices coupled to each of the electrodes (not shown). In one application, the drive devices include CMOS circuitry fabricated in processing steps (not shown) prior to the formation of the plurality of electrode devices 122. The drive devices can be used to apply voltages to the electrodes to actuate selected mirror devices present on the SOI substrate structure. Preferably, the electrode substrate structure is made using a silicon wafer or other like substrate material. Further details of both the SOI and electrode substrate structures can be found in U.S. Pat. No. 7,118,234, filed Jan. 13, 2004, commonly assigned, and hereby incorporated by reference for all purposes.

In some applications, substrates 100 and 105 are joined to form a composite substrate structure. Wafer bonding techniques are utilized to join the substrates and form a mechanical bond. Support members 116 extending from the lower surface of substrate 100 are bonded to the upper surface of the electrode substrate at locations 120. For example, support members fabricated from silicon may form a hermetic seal when bonded to silicon areas present on the upper surface of a silicon electrode substrate. Recessed regions 118 will form cavities above the electrodes 122 after the bonding process. After bonding, substrate 100 is thinned using chemical mechanical polishing (CMP), grinding, etchback, any combination of these, and the like. In one application, the buried oxide layer 112 provides an etch stop layer during the thinning process. After exposure of layer 114, mirror structures are patterned and fabricated in layer 114 as described above.

As illustrated in FIG. 1, the two substrates are aligned prior to wafer bonding. The alignment of the support members to the electrodes is controlled to assure the correct spatial relationship between the mirrors formed above regions 118 and the electrodes 122. Moreover, the alignment of the support members 116 to the bonding areas 120 on the electrode substrate is controlled to ensure the support members make the desired contact with the silicon material of the electrode substrate and not, for example, an electrode. Wafer alignment techniques have been developed, but sometimes involve additional processing steps, increasing processing costs and decreasing throughput.

Figure 2:
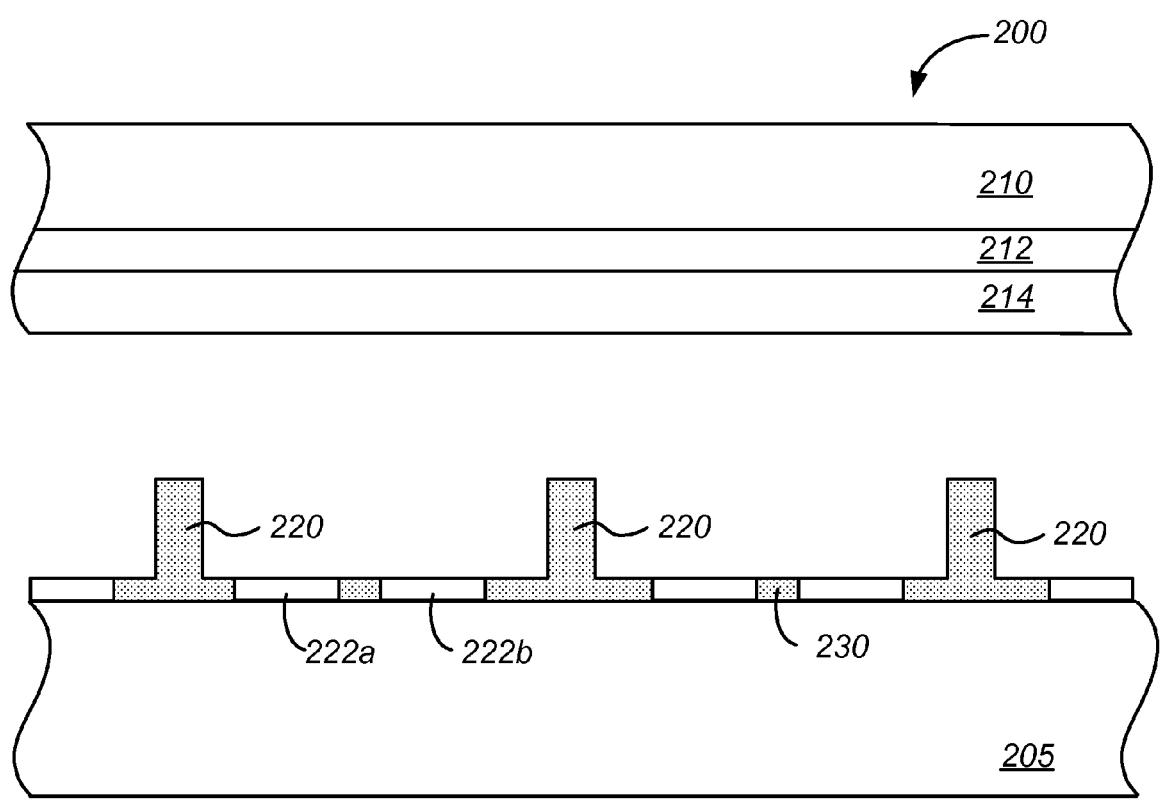
FIG. 2 is a simplified schematic side view illustration of an SOI substrate and a device substrate with integrated spacer structure according to an embodiment of the present invention.

FIG. 2 is a simplified schematic side view illustration of a first substrate and a device substrate with integrated spacer structure according to an embodiment of the present invention. As illustrated in the figure, the first substrate is an SOI substrate 200 and includes a number of layers. In one embodiment, the SOI substrate is an multi-layered substrate including a layer of silicon (210), a layer of buried oxide (212), and an additional layer of silicon (214). In a particular embodiment, the silicon layers 210 and 214 are single crystal silicon layers, although this is not required by the present invention. Alternative embodiments according to the present invention include layers of polysilicon, amorphous silicon, and other suitable substrate layers. The buried oxide layer serves as an etch stop in one embodiment of the present invention, in which substrate 200 is thinned by removal of layers 210 and 212 after bonding to substrate 205. In some embodiments of the present invention, the silicon bearing layer 214 may be reduced in thickness compared to the layer of silicon 114 illustrated in FIG. 1.

As illustrated in FIG. 2 and described more fully below, standoff structures 220 are fabricated as part of the device substrate 205, and not formed from layer 214. Consequently, the thickness of layer 214 is reduced in some embodiments, reducing the cost of the SOI substrate. Moreover, as the thickness of layer 214 is decreased, the uniformity of the layer may be increased, resulting in increased uniformity of the micro-mirrors fabricated in layer 214 according to some embodiments of the present invention. In addition, the formation of the standoff structures as an integrated structure on substrate 205 enables the removal of the etching step used to form support members 116 as illustrated in FIG. 1. Referring to FIG. 1, the morphology of surface 132, rather than being defined by the etch process, is a function of the processed used to fabricate the SOI substrate. Accordingly, polishing and finishing steps may be used to provide a smoother surface for layer 214 than typically produced by an etch process.

Device substrate 205 includes a number of layers, of which only a selected few are illustrated in FIG. 2. One layer illustrated in the figures includes electrodes 222a and 222b. In one embodiment, electrode 222a is an electrode adapted to control the tilt of the micro-mirror in a first direction and electrode 222b is an electrode adapted to control the tilt of the micro-mirror in a second direction opposite to the first direction. As will be evident to one of skill in the art, additional metal, insulator, and via layers as well as other devices are typically fabricated on substrate 205. In some embodiments of the present invention, these additional layers and devices include CMOS circuitry fabricated in processing steps prior to the formation of the electrodes 222 and utilized to drive the electrodes. In a particular embodiment, these layers, along with the layer including electrodes 222 are fabricated using standard CMOS processes.

To provide a vertical clearance between electrodes 222 and layer 214, in which micro-mirrors are formed in one embodiment, standoff structures 220 are formed on the surface of substrate 205. In embodiments according to the present invention, the standoff structures have predetermined dimensions. In an embodiment according to the present invention, the height of the standoff structure is 1.9 µm. Alternatively, the height ranges from about 0.5 µm to about 2.5 µm in other embodiments. Of course, the height will depend upon the particular applications. Additionally, the lateral dimensions of the standoff structures are predetermined. In the embodiment illustrated in FIG. 2, the standoff structures have a lateral width of 0.5 µm and are formed in a two-dimensional pattern extending into the plane of the figure. In alternative embodiments, the lateral width of the standoff structures ranges from about 0.25 µm to about 1.0 µm.

The dimensions of the standoff structures in some embodiments are defined in relation to the dimensions of the micro-mirrors formed in layer 214. For example, in a specific embodiment, the tilt angle of the micro-mirrors in an activated state is 12°. Therefore, the width, length, and depth of the micro-mirrors, along with the relationship of the micro-mirrors to the hinges upon which the micro-mirrors rotate, may be used as inputs in the determination of the standoff structure dimensions. Merely by way of example, for square micro-mirrors with diagonal hinges running from corner to corner, the distance from the center of the micro-mirror to the corner of the micro-mirror will define the hypotenuse of a right triangle. The tilt angle of 12° will define the angle between the bottom of the right triangle and the hypotenuse. Thus, one may calculate the minimum height of the standoff structure for which contact is made between the corner of the micro-mirror and substrate 205 when the micro-mirror is in the activated state. Of course, electrodes extending above the surface of substrate 205, along with other device features, will impact the calculation process and the results produced.

As illustrated in the FIG. 2, the standoff structures are fabricated from silicon oxide ($Si_xO_y$), but this is not required by the present invention. Other suitable materials may be used within the scope of the present invention. For example, standoffs fabricated from silicon nitride ($Si_xN_y$) are utilized in alternative embodiments. In yet other embodiments, silicon oxynitride (SiON) is used to fabricate the standoff structures. Moreover, polysilicon material, including amorphous polysilicon, is utilized in yet another alternative embodiment according to the present invention. Materials with suitable characteristics, including formation of a strong bond with layer 214, good adhesion to substrate 205, and mechanical rigidity, are acceptable substitutes for $Si_xO_y$ materials.

Moreover, in some embodiments of the present invention, the process used to deposit the layer or layers from which the standoff structures are fabricated is performed in light of the structures present on the device substrate. For example, some CMOS circuitry may be adversely impacted by performing high temperature deposition processes, as these high temperature deposition processes may damage metals or result in diffusion of junctions associated with the CMOS circuitry. Thus, in a particular embodiment of the present invention, low temperature deposition, patterning, and etching processes, such as processes performed at temperatures of less than 500° C., are used to form the layer from which the standoff structures are fabricated. In another specific embodiment, deposition, patterning, and etching processes performed at less than 400° C., are used to form the layer from which the standoff structures are fabricated.

Figure 3A:
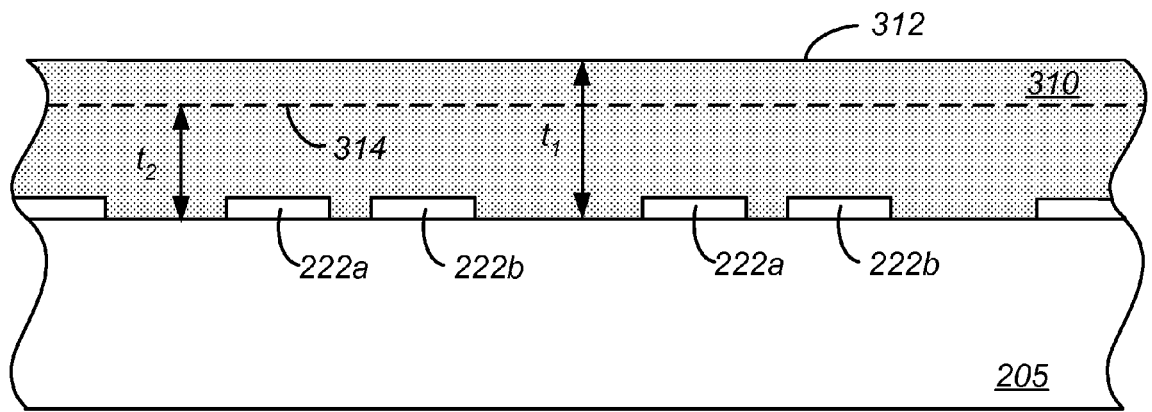
FIGS. 3A-3G are simplified schematic illustrations of a process flow according to an embodiment of the present invention.

FIGS. 3A-3E are simplified schematic illustrations of a process flow according to an embodiment of the present invention. As illustrated in FIG. 3A, substrate 205 is provided and processed as described above. Initial processing steps typically include the formation of CMOS circuitry. Additional details of the fabrication processes for the device substrate are provided in co-pending and commonly owned U.S. Pat. No. 7,022,245, filed Jan. 13, 2004, which is hereby incorporated by reference for all purposes. Electrodes 222a and 222b are typically formed by the deposition and/or patterning of a metal layer. After formation of the electrodes, layer 310, with a thickness of $t_1$, is deposited on substrate 205. Layer 310 is a silicon dioxide ($SiO_2$) layer in a specific embodiment of the present invention, but as described above, this is not required by the present invention. Other suitable materials may be used within the scope of the present invention. For example, layer 310 is formed by deposition of silicon nitride ($Si_3N_4$) or silicon oxynitride (SiON) layers in alternative embodiments. Moreover, polysilicon material, including amorphous polysilicon, is deposited to form layer 310 in yet another alternative embodiment according to the present invention.

The deposited layer 310 has a predetermined thickness $t_1$ as initially deposited. In a specific embodiment, the thickness $t_1$ is 2.6 µm. In other embodiments, the thickness ranges from about 1.0 µm to about 3.0 µm. Of course, the thickness will depend on the particular applications. As illustrated in FIG. 3A, the upper surface 312 of the deposited layer 310 is uniform across the substrate 205 in FIG. 3A, resulting in a planar surface. However, a planar surface after deposition is not required by the present invention. In a particular deposition process, the patterned nature of the electrodes 222 results in the thickness of layer 310 varying as a function of lateral position, producing an upper surface 312 that is not entirely flat.

To planarize the upper surface 312 of the deposited layer 310, an optional CMP step is performed in an embodiment of the present invention. The results produced by the CMP process are illustrated by dashed line 314 in FIG. 3A and thickness $t_2$ in FIGS. 3A and 3B. Standoff material present above line 314 is removed during the CMP process, resulting in a highly polished and planarized layer 316 of thickness $t_2$. In a particular embodiment, the root-mean-square (RMS) roughness of the planarized surface 314 is less than or equal to about 5 Å. As will be described below, the extremely smooth surface produced during the CMP process facilitates bonding of the composite substrate to the device substrate. In embodiments according to the present invention, the height $t_2$ of the standoff structure after the CMP process is about 1.9 µm. Alternatively, the height ranges from about 0.5 µm to about 2.5 µm in other embodiments. Of course, the height will depend upon the particular applications.

Figure 3B:
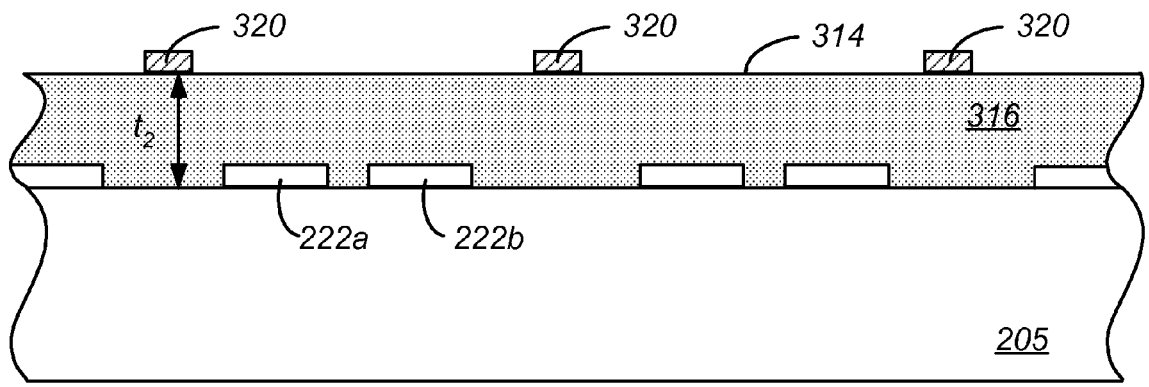

FIG. 3B illustrates a photolithography process in which a photoresist layer is deposited and patterned to form an etch mask 320 on surface 314 of the standoff layer 316. As illustrated in the figure, the standoff layer has been planarized and thinned to thickness $t_2$, providing surface 314 as the upper surface of the standoff layer. The photolithography process is well known and as will be evident to one of ordinary skill in the art, the dimensions of the etch mask 320 may be tightly controlled during photolithography. Etch mask 320 may be formed from any suitable material that is resistant to the etching process used to etch the standoff material. In a specific embodiment, an etch mask of metal such as Al or TiN is utilized. Although the etch mask 320 is illustrated in one dimension in FIG. 3B, it will evident to one of skill in the art that a two-dimensional pattern may be formed on the surface 314 to produce standoff regions of the desired geometry. Merely by way of example, FIG. 3G illustrates a simplified top view of one two-dimensional pattern possible for the standoff regions.

Figure 3C:
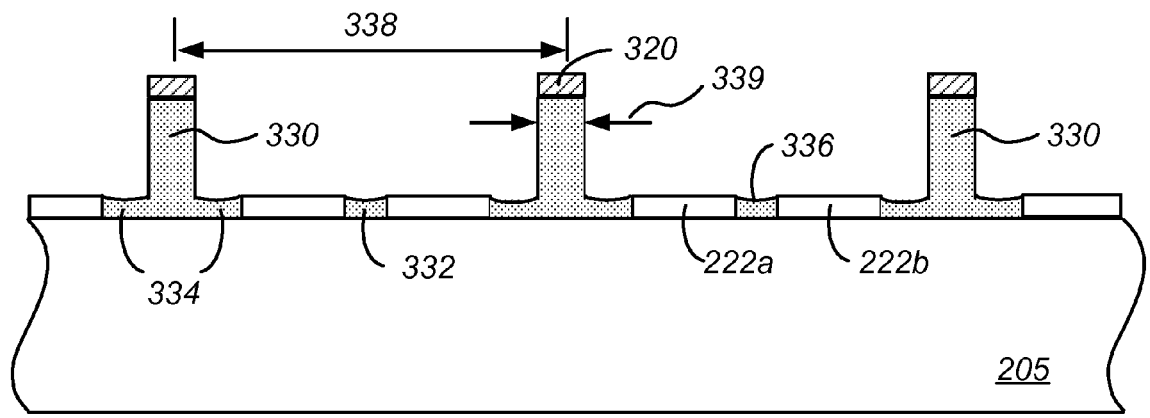

FIG. 3C illustrates substrate 205 and patterned standoff regions 330 after an etch process. As illustrated in the figure, portions of the standoff layer 316 have been removed during the etch process, resulting in the formation of standoff regions 330. The lateral dimensions of the standoff regions 330 are a function of the geometry of the etch mask 320 and the etch process. As illustrated in the figure, the center to center spacing between the standoff regions along line 338 is 13.5 μm. For micro-mirrors with a square shape, the center to center spacing is the same in the direction perpendicular to line 338. Of course, for rectangular micro-mirrors, the spacing in perpendicular directions may vary. Additionally, the micro-mirrors associated with the electrodes 222 will have dimensions smaller than the center to center spacing of the standoff regions, permitting the micro-mirrors to move in response to electrical signals present at the electrodes.

Embodiments of the present invention in which the standoff regions are fabricated from silicon oxide, silicon nitride, or silicon oxynitride, or combinations thereof, provide benefits based on the electrical and thermal properties of the standoff region material. For example, these materials, among others, provide a high degree of electrical insulation, electrically isolating the device substrate from the mirror layer 214. Moreover, the thermal properties of the material used to deposit the standoff layer, such as thermal insulation, are provided by some embodiments. Merely by way of example, light absorbed by micro-mirrors fabricated in layer 214 may increase the temperature of the micro-mirrors. Thus, for instance, a thermally insulating standoff region will reduce the conduction of heat from the micro-mirrors to the device substrate. Other suitable standoff regions materials, such as polysilicon material, including amorphous polysilicon are characterized by electrical and thermal properties that provide benefits in alternative embodiments.

As illustrated in FIG. 3C, an isotropic etch has been used to define the standoff regions 330. The etch profile defines vertical walls for the standoff regions with a predetermined thickness. In the illustration, the lateral thickness 339 of the standoff regions is 0.5 μm. In other embodiments, the thickness of the standoff regions varies from about 0.25 μm to about 1 μm. As will be evident to one of skill in the art, the fill factor of the spatial light modulator will be a function of the thickness of the standoff regions. Some dishing of the upper surface 336 of the oxide layers 332, deposited between electrodes 222, is illustrated in the figure, but this is not required by the present invention. Additionally, dishing of the oxide 334 adjacent to the standoff regions 330 is illustrated in the figure, but this effect is a function of the etch process. An etch process that terminates at the upper surface of the electrodes 222 is used in an alternative process that results in simultaneous exposure of the electrodes and passivation of the surface of the substrate 205. In yet another embodiment, the etching process is terminated prior to exposure of the electrode layer, enabling the standoff layer 316 to not only provide mechanical support in the form of standoff regions 330, but additional passivation benefits to the electrodes on substrate 205.

As discussed above, in some embodiments of the present invention, the processes used to deposit, pattern, and etch the layer or layers from which the standoff structures are fabricated are performed at low temperatures. For example, these processing steps may be performed with a view to the structures present on the device substrate prior to the formation of the standoff structures, such as CMOS circuitry. Since some CMOS circuitry may be adversely impacted by performing high temperature deposition processes, which may damage metals coupling CMOS transistors or result in diffusion of junctions associated with the CMOS circuitry, low temperature deposition processes are utilized according to some embodiments of the present invention. Moreover, in a particular embodiment of the present invention, low temperature deposition, patterning, and etching processes, such as processes performed at temperatures of less than 500° C., are used to form the layer or layers from which the standoff structures are fabricated. In another specific embodiment, deposition, patterning, and etching processes performed at less than 400° C., are used to form the layer from which the standoff structures are fabricated. One of ordinary skill in the art would recognize many variations, modifications, and alternatives within the scope of low temperature processes.

Figure 3D:
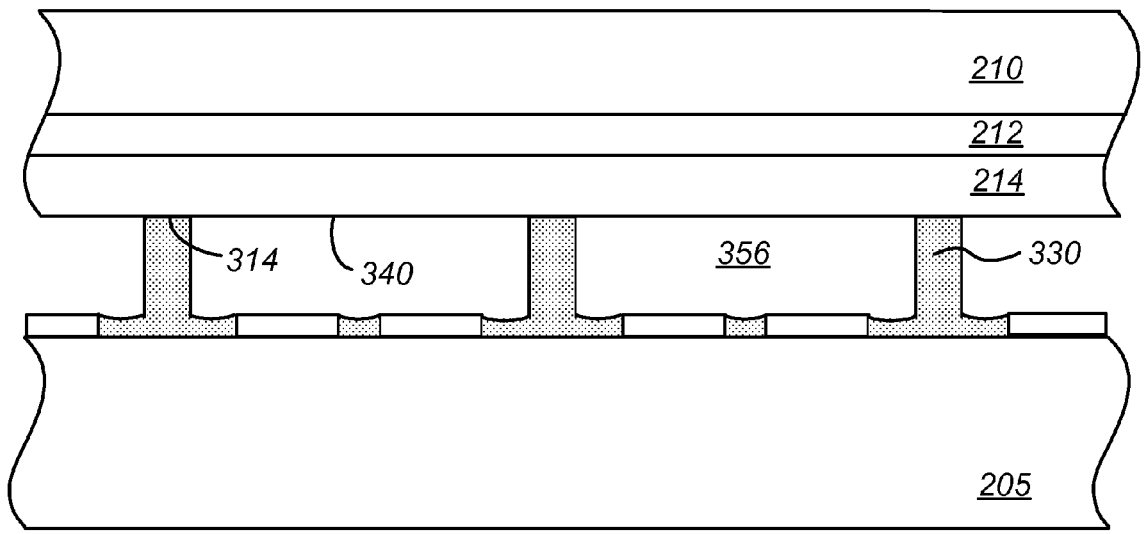

FIG. 3D illustrates the process step of bonding the SOI substrate to substrate 205 to form a composite substrate structure. As illustrated, the etch mask is removed and the SOI substrate and the device substrate are bonded together via surface 340 of layer 214 and upper surfaces 314 of the standoff structures 330 to form cavities 356. Bonding can occur using a variety of techniques. In a specific embodiment, the bonding occurs using a room temperature covalent bonding process. Each of the faces is cleaned and activated, e.g., by plasma activation or by wet processing. The activated surfaces are brought in contact with each other to cause a sticking action. In some bonding processes, mechanical force is provided on each substrate structure to press the faces together. In embodiments in which layer 214 is silicon and the standoff regions are silicon oxide, silicon bearing bonds are created between the two faces. In alternative embodiments, an oxide layer is formed on surface 340 prior to bonding to provide an oxide-oxide bond interface. The upper surface 314 of the layer from which standoff structures are formed is polished by a CMP process in one embodiment while the bonding surface of layer 214 is polished as well, providing an extremely smooth surface that is conducive to covalent bonding processes. Of course, one of ordinary skill in the art would recognize many other variations, modifications, and alternatives.

Because the standoff regions and the electrodes are formed on substrate 205, the alignment tolerances for the wafer bonding process are greatly relaxed in comparison to the tolerances present using the structure illustrated in FIG. 1. For example, in some embodiments of the present invention, the tolerance requirement for aligning the two substrates prior to joining is less than 1 cm. Tolerance requirements on the order of millimeters are therefore available through embodiments of the present invention, in contrast to tolerance requirements on the order of microns for the structure illustrated in FIG. 1.

Figure 3E:
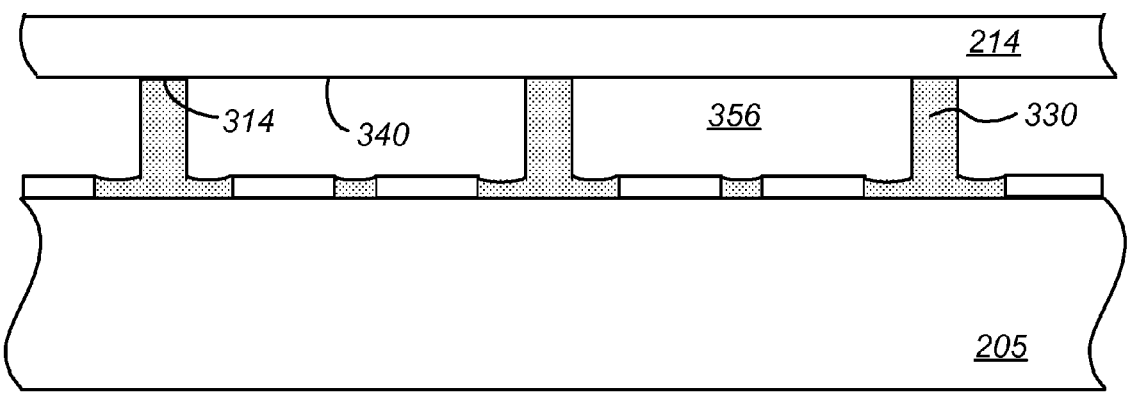

FIG. 3E illustrates the process steps of removing layers 210 and 212 of the SOI substrate. As illustrated, after joining of the substrates to form a bonded or composite substrate structure, layers 210 and 212 are removed to expose layer 214. The buried oxide layer 212 serves as an etch stop in one embodiment of the present invention, in which the SOI substrate is thinned by removal of layers 210 and 212 after wafer bonding. Plasma ashing is used in some embodiments to remove the buried oxide layer 212 and expose layer 214. Removal of the layers 210 and 212 is performed using CMP processes in alternative embodiments of the present invention. One of ordinary skill in the art would recognize many variations, modifications, and alternatives. After the thinning process, the layer 214 is exposed, making the layer available for the formation of micro-mirrors in layer 214.

Figure 3F:
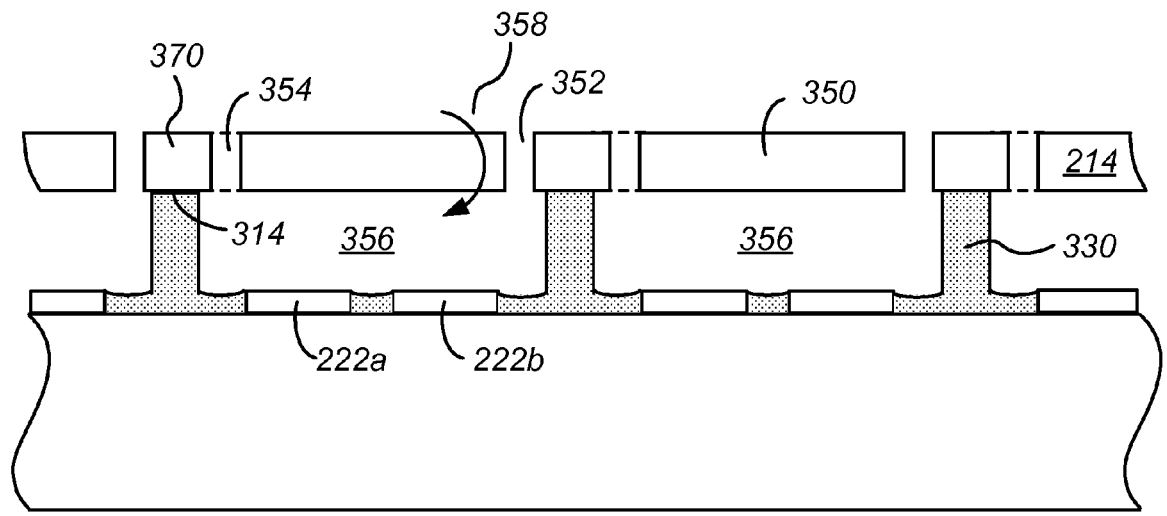
Figure 3G:
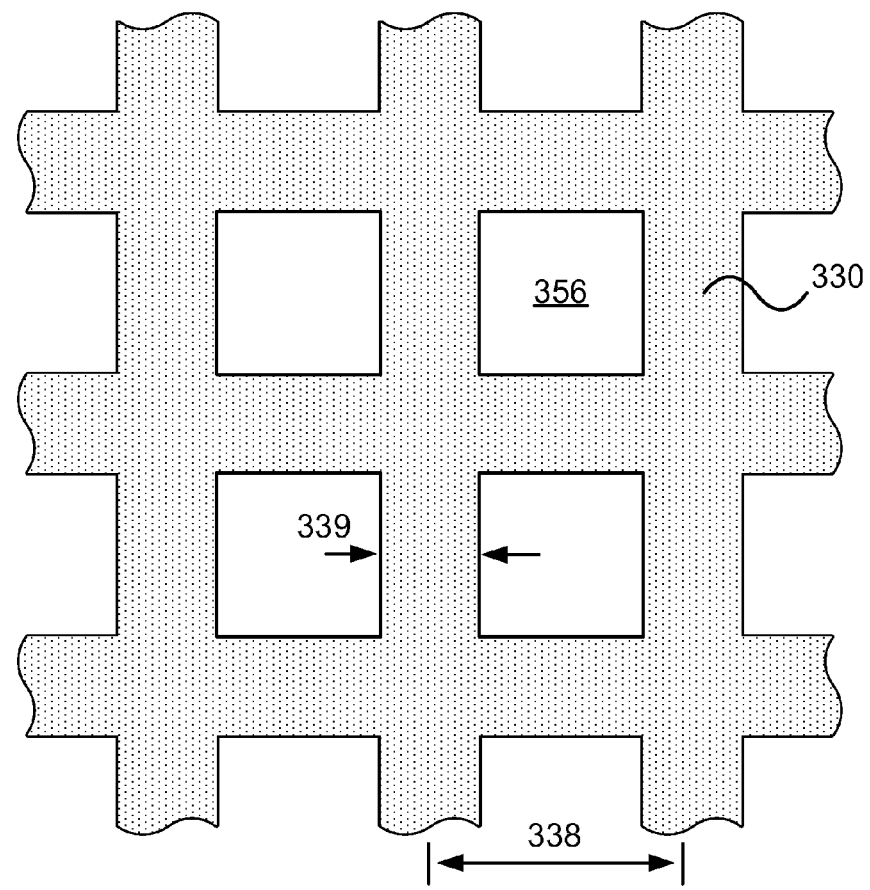

FIG. 3F illustrates the process steps of forming micro-mirrors in layer 214 of the SOI substrate. Patterning and etching of layer 214 results in the fabrication of micro-mirrors 350. As illustrated in the figure, typically mirrors 350 are formed above cavities 356 and are positioned with respect to electrodes 222a and 222b to facilitate control of the mirrors through electrical signals present at the electrodes. Thus, it is desirable to align the patterning and etching of the micro-mirrors formed from layer 214 with the electrodes present on the device substrate. In a particular embodiment, the thickness of the silicon layer 214 is reduced to a level at which the silicon layer is semi-transparent in the visible region of the optical spectrum. For example, when the thickness of silicon layer 214 is reduced to 0.3 μm, the device substrate may be image through layer 214. Thus, the patterning of layer 214 for the formation of the hinges 354 and the clearance openings 352 is performed by imaging alignment marks present on the upper surface of the device substrate 205.

As illustrated in FIG. 3F, hinges are illustrated by dashed lines 354. Hinge support regions 370 are present in the silicon layer 214 and bonded to standoff structures 330. As an example, the hinges illustrated in the figure are torsion spring hinges aligned perpendicular to the edge of the micro-mirror structure 350 that is illustrated in the figure. These hinges provide for movement of the right side of the micro-mirrors toward the device substrate in the direction represented by arrow 358. In alternative embodiments, the hinges are formed diagonally from one corner of the micro-mirror to another, enabling the micro-mirror to rotate about other axes. Examples of micro-mirror hinge designs, including diagonal hinges is found in U.S. Pat. No. 7,118,234, filed Jan. 13, 2004, commonly assigned, and hereby incorporated by reference for all purposes. In these embodiments, layer 214 is patterned and etched to form openings 352 and hinges 354, depending on the particular geometry of the hinge and the micro-mirrors.

FIG. 3G is a simplified top-view of standoff regions 330 according to an embodiment of the present invention. Although FIG. 3G is not drawn to scale, it illustrates the general features of the standoff regions. Particularly, although the dimensions of the standoff regions 330 and the cavities 356 are illustrated as about equal in size in the figure, this is not required by the present invention. As illustrated in the figure, the top portions 314 of the standoff regions form a two-dimensional waffle pack pattern when viewed from the top. Layer 214 is not represented in this illustration for purposes of clarity. Typically, the micro-mirrors associated with this structure would be square micro-mirrors with torsion spring hinges. The width of the standoff regions are selected to provide support for the hinge support regions 370 while providing sufficient fill factor for optical applications. Moreover, the center to center spacing of adjacent sections, the lateral clearance between individual micro-mirrors and the standoff regions, and other geometrical design parameters are selected in accordance with optical and mechanical system objectives.

Figure 4:
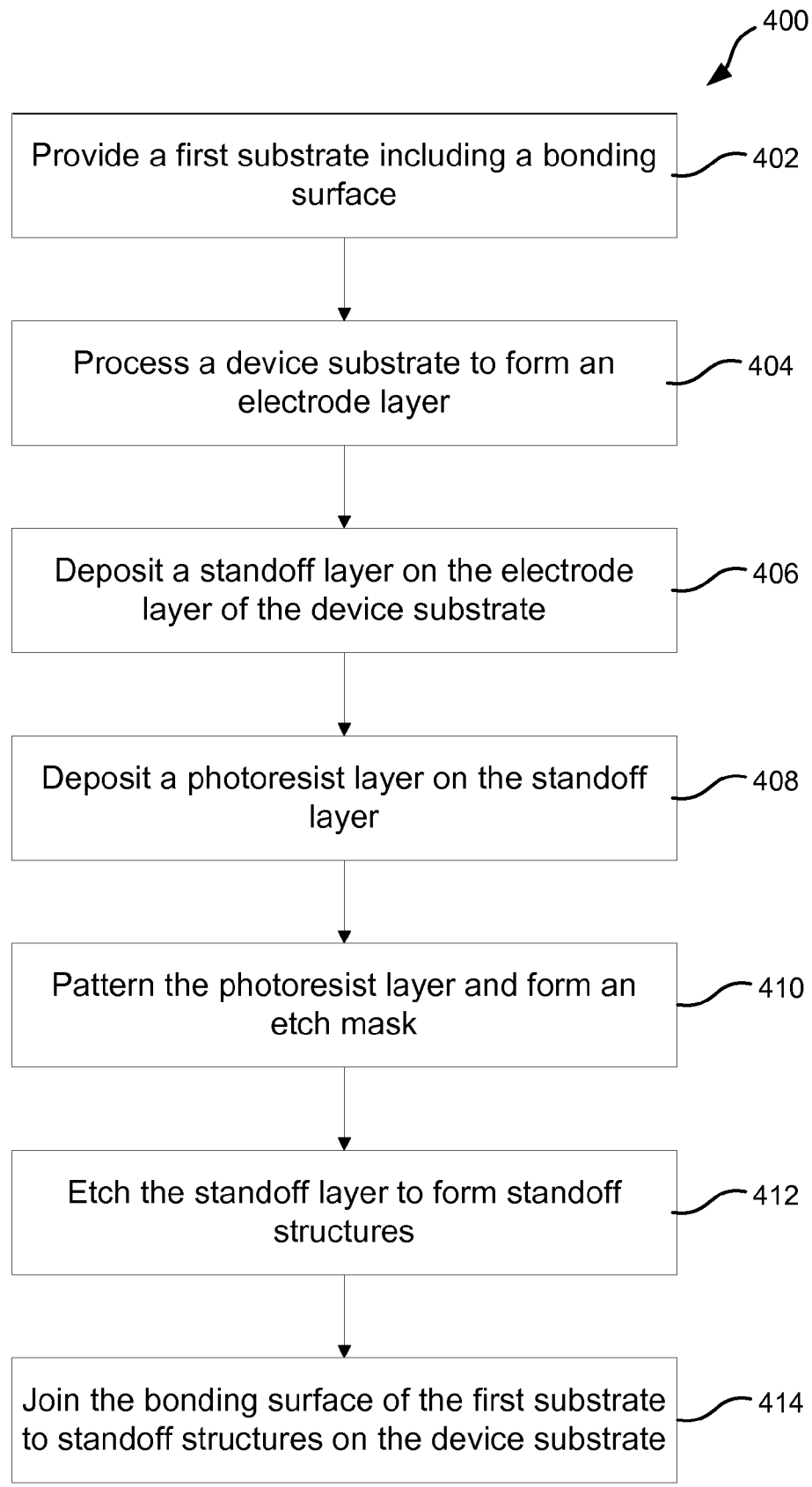
FIG. 4 is simplified flowchart illustrating a method of fabricating an integrated SLM according to one embodiment of the present invention.

FIG. 4 is simplified flowchart illustrating a method of fabricating an integrated SLM according to one embodiment of the present invention. The process flow 400 includes providing a first substrate in step 402. In a specific embodiment, the first substrate is a multilayered SOI substrate with single crystal silicon layers surrounding a buried oxide layer. In step 404, a device substrate is processed to form at least an electrode layer. Additional layers are formed in some embodiments of the present invention, with the electrode layer being the last layer defined by the processing steps. The geometry and structure of the electrodes is selected to correlate with mirrors fabricated in at least one layer of the first substrate. In some embodiments, the layers formed on the device substrate include layers defined using standard CMOS processes including interconnect wiring and via formation.

In step 406, a standoff layer is deposited on the electrode layer of the device substrate. In a specific embodiment, the standoff layer is a silicon oxide layer as described above. Other standoff layer materials, including silicon nitride, amorphous silicon, and low temperature poly-silicon are utilized in alternative embodiments. In embodiments of the present invention, the formation of the standoff layer is performed using low temperature deposition processes, for example, temperatures less than 500° C. In a particular embodiment according to the present invention, the standoff layer is formed using a deposition process performed at a temperature of less than about 400° C. In these embodiments, the deposition and processing of the standoff layer does not adversely impact the circuitry previously fabricated on the device substrate. The thickness of the standoff layer is a predetermined thickness. In one embodiment, the thickness of the standoff layer as deposited is about 2.0 μm. In alternative embodiments the thickness ranges from about 0.5 μm to about 5.0 μm.

In step 408, a photoresist layer is deposited on the standoff layer. The photoresist layer is patterned in step 410 and subsequent processing steps are used to form an etch mask. The formation of an etch mask will be evident to those of skill in the art. In step 412, the etch mask is used to etch selected portions of the standoff layer to form standoff structures. In a particular embodiment, the etch process is terminated when the electrode layer is exposed. In other embodiments, the etch process is terminated prior to exposure of the electrodes present on the device substrate, providing a passivation layer for the electrodes. The lateral shape of the standoff structures is a function of the etch process used in step 412. In one embodiment, an anisotropic etch is used that provides vertical sidewalls. In another embodiment, a combination of an anisotropic (dry) and an isotropic (wet) etch is used to provide vertical sidewalls over a majority of the standoff structure combined with a chemically etched surface when the etching process is terminated.

In step 414 the bonding surface of the first substrate is joined to the standoff structures located on the device substrate. As discussed above, a variety of wafer bonding techniques are employed in embodiments of the present intention. In a particular embodiment, the bonding process is a room temperature covalent bonding process, forming hermetic bonds at the interface between the standoff structures and the bonding surface of the first substrate.

It should be appreciated that the specific steps illustrated in FIG. 4 provide a particular process flow according to one embodiment of the present invention. Other sequence of steps may also be performed according to alternative embodiments. For example, alternative embodiments of the present invention may perform the processing steps outlined above in a different order. For example, the order in which the substrates are processed may be varied, with the device substrate being processed prior to the first substrate. Moreover, the individual steps illustrated in FIG. 4 may include multiple sub-steps that may be performed in various sequences as appropriate to the individual step. For example, in step 404, the devices formed on the device substrate may include multiple device features that may be defined in various sequences within the scope of the present invention. Furthermore, additional processing steps may be added or removed depending on the particular applications. One of ordinary skill in the art would recognize many variations, modifications, and alternatives.

Figure 5:
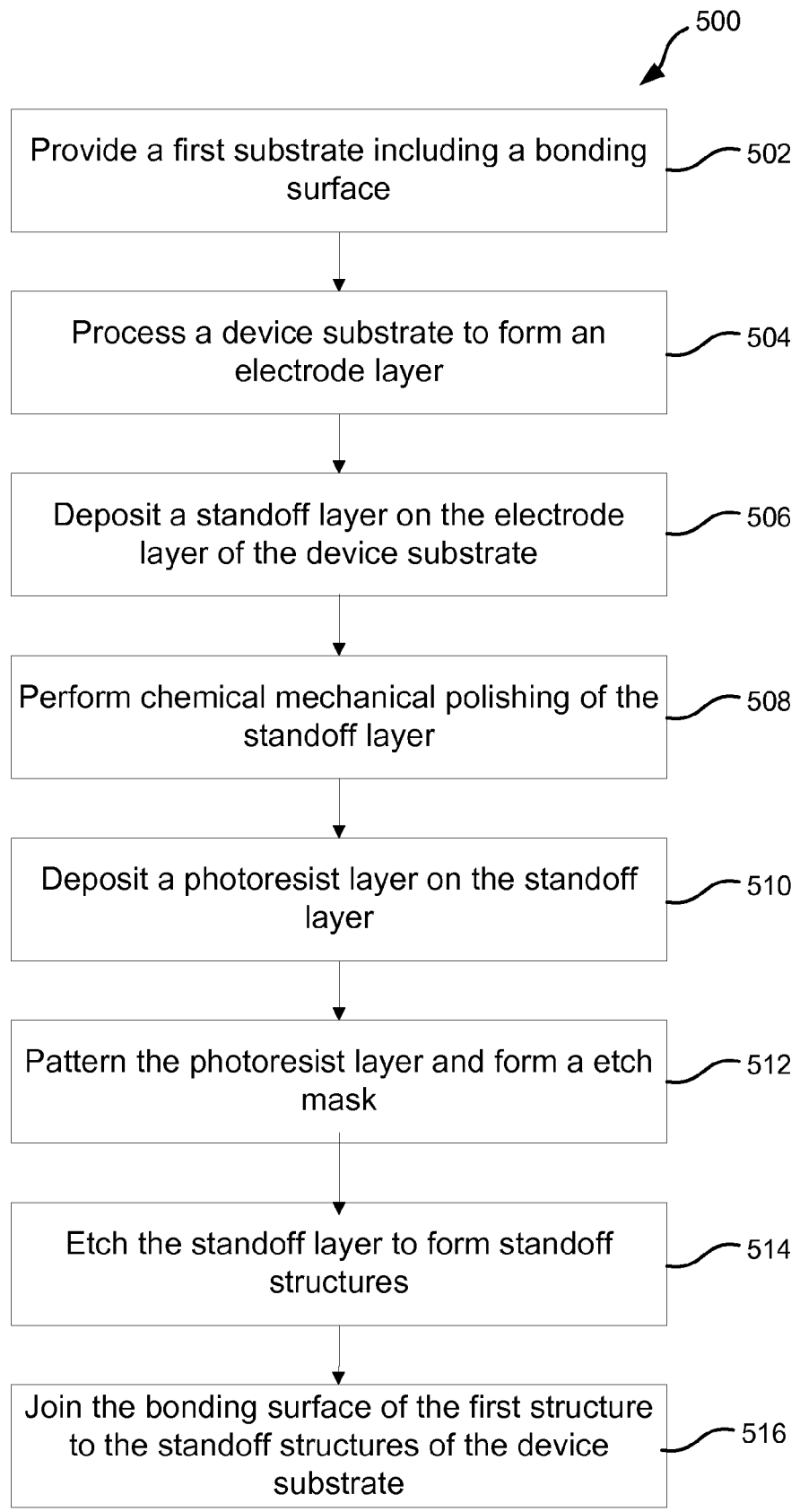
FIG. 5 is a simplified flowchart illustrating a method of fabricating an integrated SLM according to another embodiment of the present invention.

FIG. 5 is a simplified flowchart illustrating a method of fabricating an integrated SLM according to another embodiment of the present invention. The process flow 500 includes providing a first substrate in step 502. In a specific embodiment, the first substrate is a multilayered SOI substrate with silicon layers surrounding a buried oxide layer. In some embodiments, the silicon layers are single crystal silicon layers although this is not required by the present invention. In step 504, a device substrate is processed to form at least an electrode layer. Additional layers are formed in some embodiments of the present invention, with the electrode layer being the last layer defined by the processing steps. The geometry and structure of the electrodes is selected to correlate with mirrors fabricated in at least one layer of the first substrate.

In step 506, a standoff layer is deposited on the electrode layer of the device substrate. In a specific embodiment, the standoff layer is a silicon oxide as described above, although this is not required by the present invention. Other standoff layer materials, including silicon nitride, amorphous silicon, and poly-silicon are utilized in alternative embodiments. In some embodiments, a combination of these layers is deposited to form a composite multi-layer standoff structure. The thickness of the standoff layer is a predetermined thickness. In the embodiment illustrated by the process flow in FIG. 5, the thickness of the standoff layer is selected to be greater than the eventual height of the standoff structures. In this embodiment, the thickness of the standoff layer is about 3.0 µm.

In step 508, a CMP process is performed to reduce the thickness of the as deposited standoff layer and produce a uniform upper surface for the standoff layer. In one embodiment, the RMS roughness of the upper surface of the standoff layer is about 5 Å after the CMP process is completed. As described above, the CMP process results in extremely smooth bonding surfaces of the standoff structure, enhancing the bond formed in later steps. In a specific embodiment, the CMP process removes an upper portion of the standoff layer, resulting in a standoff layer that is about 1.9 µm in thickness.

In step 510, a photoresist layer is deposited on the standoff layer. The photoresist layer is patterned in step 512 and subsequent processing steps are used to form an etch mask. The formation of an etch mask will be evident to those of skill in the art. In step 514, the etch mask is used to etch the standoff layer to form standoff structures. The etch mask protects the polished surfaces of the standoff structures during the etch process. In a particular embodiment, the etch process is terminated when the electrode layer is exposed. In other embodiments, the etch process is terminated prior to exposure of the electrodes present on the device substrate, providing a passivation layer for the electrodes. The lateral shape of the standoff structures is a function of the etch process used in step 514. In one embodiment, an anisotropic etch is used that provides vertical sidewalls. In another embodiment, a combination of an anisotropic (dry) and an isotropic (wet) etch is used to provide vertical sidewalls over a majority of the standoff structure combined with a chemically etched surface when the etching process is terminated.

In step 516 the bonding surface of the first substrate is joined to the standoff structures located on the device substrate. As discussed above, a variety of wafer bonding techniques are employed, including room temperature covalent bonding, in embodiments of the present intention.

It is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A method of fabricating an integrated spatial light modulator, the method comprising:
   providing a first substrate including a bonding surface;
   processing a device substrate to form at least an electrode layer, the electrode layer including a plurality of electrodes;
   depositing a first electrically insulating portion of a multi-layer standoff layer on the electrode layer;
   depositing a second electrically insulating portion of the multi-layer standoff layer on the first electrically insulating portion of the multi-layer standoff layer;
   forming standoff structures from the multi-layer standoff layer;
   joining the bonding surface of the first substrate to the standoff structures on the device substrate;
   thinning the first substrate;
   patterning the first substrate to form a mask; and
   forming a plurality of moveable structures from the first substrate, at least one of the plurality of moveable structures aligned with at least one of the plurality of electrodes and adapted to rotate with respect to the standoff structures.

2. The method of claim 1 further comprising, after the step of depositing the second electrically insulating portion of the multi-layer standoff layer, performing chemical mechanical polishing of the second portion of the multi-layer standoff layer to planarize an upper surface of the second electrically insulating portion of the multi-layer standoff layer.

3. The method of claim 1 wherein the first substrate is a silicon on insulator substrate.

4. The method of claim 3 wherein thinning the first substrate comprises removing a first silicon layer of the silicon on insulator substrate and a buried oxide layer of the silicon on insulator substrate to expose a second semi-transparent silicon layer.

5. The method of claim 1 wherein at least one of the first electrically insulating portion of the multi-layer standoff layer or the second electrically insulating portion of the multi-layer standoff structure is fabricated from silicon oxide.

6. The method of claim 1 wherein at least one of the first electrically insulating portion of the multi-layer standoff layer or the second electrically insulating portion of the multi-layer standoff structure is fabricated from silicon nitride.

7. The method of claim 1 wherein at least one of the first electrically insulating portion of the multi-layer standoff layer or the second electrically insulating portion of the multi-layer standoff structure is deposited using a low temperature deposition process performed at a temperature of less than 400° C.

8. The method of claim 7 wherein the device substrate comprises CMOS circuitry.

9. The method of claim 1 wherein the standoff structures have a height of between 0.5 µm and 2.5 µm.

10. The method of claim 1 wherein forming standoff structures from the multi-layer standoff layer comprises etching the multi-layer standoff layer to form the standoff structures.

11. The method of claim 1 wherein the step of joining is performed using an alignment process with a tolerance requirement of less than 1 cm.

12. The method of claim 11 wherein the step of joining comprises forming a covalent bond at room temperature.

13. The method of claim 12 wherein the step of joining further comprises a plasma activation process and a room temperature covalent bonding process.

14. A method of fabricating an integrated spatial light modulator, the method comprising:
- providing a first substrate including a bonding surface;
- processing a device substrate to form at least an electrode layer, the electrode layer including a plurality of electrodes;
- depositing an electrically insulating standoff layer on the electrode layer;
- forming electrically insulating standoff structures from the standoff layer, wherein the standoff structures are characterized by a height of between 0.5 μm and 2.5 μm;
- joining the bonding surface of the first substrate to the standoff structures on the device substrate;
- thinning the first substrate;
- patterning the first substrate to form a mask; and
- forming a plurality of moveable structures from the first substrate, at least one of the plurality of moveable structures aligned with at least one of the plurality of electrodes and adapted to rotate at least with respect to the standoff structures.

15. The method of claim 14 wherein the at least one of the plurality of moveable structures is adapted to rotate by an angle of ±12°.

16. The method of claim 15 wherein the at least one of the plurality of moveable structures is adapted to rotate by an angle of ±13°.

17. The method of claim 16 wherein the at least one of the plurality of moveable structures is adapted to rotate by an angle of ±14°.

18. The method of claim 14 further comprising, after the step of depositing a electrically insulating standoff layer, performing chemical mechanical polishing of the electrically insulating standoff layer to planarize an upper surface of the electrically insulating standoff layer.

19. The method of claim 14 wherein the first substrate is a silicon on insulator substrate.

20. The method of claim 14 wherein the electrically insulating standoff layer comprises at least one of silicon oxide or silicon nitride.

21. The method of claim 14 wherein the device substrate comprises CMOS circuitry.

22. The method of claim 14 wherein forming standoff structures from the standoff layer comprises etching the electrically insulating standoff layer to form the standoff structures.

23. The method of claim 14 wherein the step of joining comprises forming a covalent bond at room temperature.

24. The method of claim 23 wherein the step of joining further comprises a plasma activation process and a room temperature covalent bonding process.

* * * * *